United States Patent Office 3,436,177
Patented Apr. 1, 1969

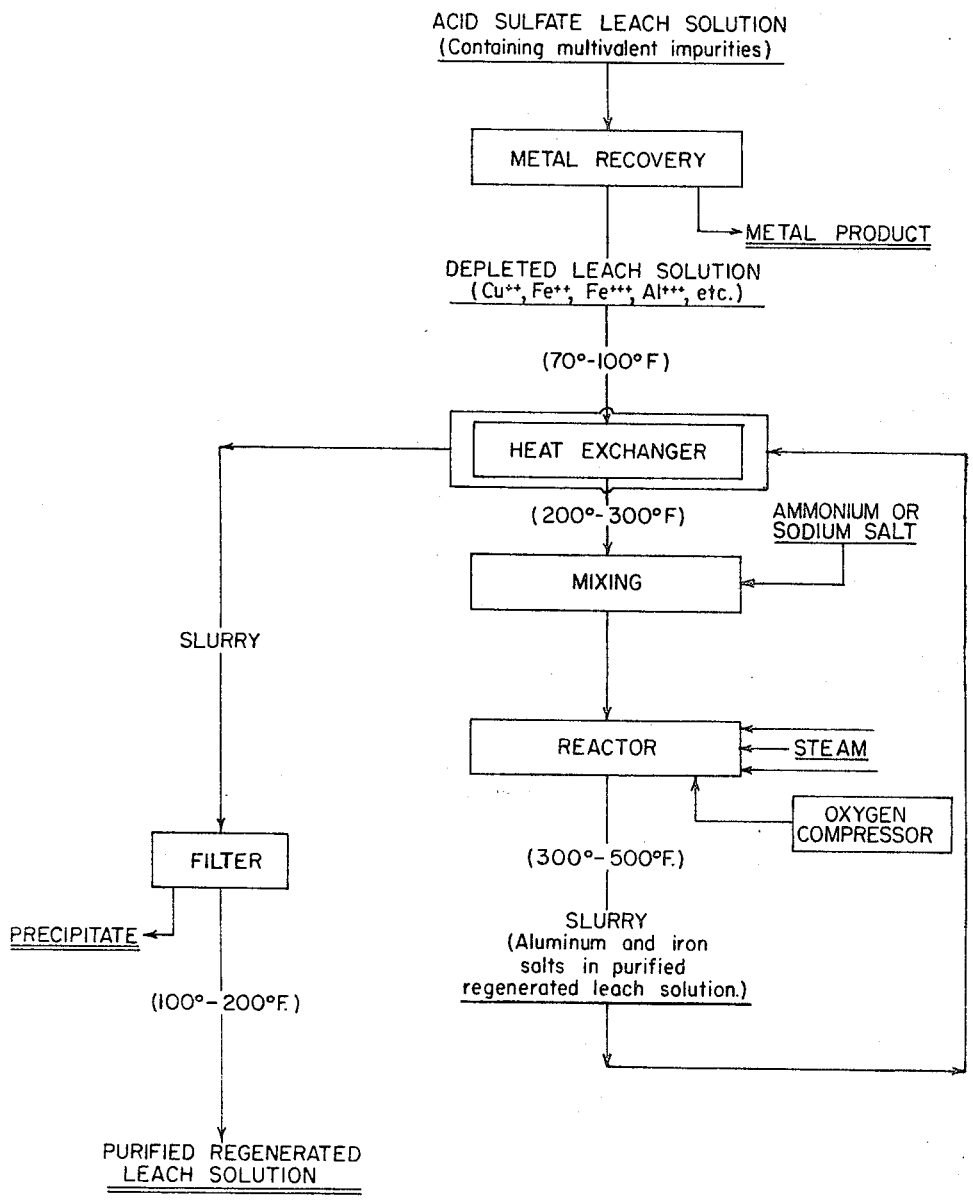

3,436,177
CONTINUOUS PROCESS FOR REMOVING MULTI-VALENT IMPURITIES FROM COPPER-BEARING LEACH SOLUTIONS
Henry Rush Spedden and Alfred Kenneth Schellinger, Salt Lake City, Utah, assignors to Kennecott Copper Corporation, New York, N.Y., a corporation of New York
Continuation-in-part of application Ser. No. 533,965, Mar. 14, 1966. This application Feb. 28, 1968, Ser. No. 709,140
Int. Cl. C22b *15/08*
U.S. Cl. 23—172                    10 Claims

ABSTRACT OF THE DISCLOSURE

Acid sulfate leach solutions contaminated with relatively high concentrations of iron and aluminum are subjected to elevated pressure and temperature conditions to cause the precipitation, due to hydrolysis, of both iron and aluminum precipitates and the regeneration of sulfuric acid. The leach solution is simultaneously contacted with oxygen to adjust the level of ferric ions remaining in the treated solution. The process also effects the removal from the leach solution of other multivalent contaminants such as arsenic and manganese. After being conditioned by the removal of impurities and the generation of acid, the leach liquor is suitable for recycle for use in leaching further metal values from ore dumps or vats. The precipitate may be processed for the recovery of iron, aluminum, or other valuable constituents.

RELATED APPLICATION

This application is a continuation-in-part of U.S. Ser. No. 533,965, filed Mar. 14, 1966.

The aforesaid copending application describes and claims a process for producing high purity alumina from aluminum-bearing, acidic, sulfate solutions. According to that application, aluminum-bearing, acidic, sulfate solutions, containing a low ratio of aluminum to heavy metal and iron content, are treated at elevated temperatures, ranging from 250° to 450° F., in the presence of sodium or ammonium ions. A granular sodium or ammonium alunite, containing only a small amount of impurities, is thereby produced. Thus, the parent application teaches a process whereby a coarse, readily filterable, alunite precipitate is produced from a solution containing both dissolved aluminum and dissolved iron as well as other impurities. The impurity-bearing solution may be treated to remove iron and other impurities. The present application discloses and claims a modification of the parent invention whereby iron and aluminum are removed concurrently and continuously in the form of a coarse, readily filterable precipitate. Simultaneously, sulfuric acid is generated. In this fashion, there is continuously produced reacidified, purified solution suitable for recycle to a leaching operation.

BACKGROUND OF THE INVENTION

Field

This invention relates to the purification and regeneration of dilute acid sulfate leach solutions useful for the extraction of copper from dumps, heaps, waste, ore in vats or vessels, and in-place ore. Specifically, it provides a continuous process for the removal of multivalent impurities from solutions in the form of a desirable precipitate.

Prior art

The leaching of copper-bearing ore and waste materials with dilute acid sulfate leach solutions is widely practiced. Similar procedures and reagents have been suggested for leaching other materials such as aluminum. Millions of gallons of water are circulated in the daily recycling of leach solution for a large scale leaching operation. Such operations are usually located in arid or semi-arid regions; thus, water conservation is a principal consideration. Impurities build up in the recirculated solution and interfere with leaching efficiency or processing so that a continual purge of the leach solution and its replacement with fresh water is necessitated. The only alternative for the purge stream is to treat all, or a portion, of the leaching solution during each cycle, or periodically, to remove impurities therefrom. The most noxious of the impurities which build up in the recirculated leach solution are iron, aluminum, and other polyvalent elements capable of providing multivalent cations to the leach solution.

Many proposals have been made by persons skilled in the art according to which particular noxious impurities are removed from leach liquors. These proposals have generally been directed to either the removal of iron or the removal of aluminum and sulfate impurities. Thus, it has been the practice to separate the recycle leach liquor into at least two portions, one of which is treated for the removal of aluminium and sulfate impurities while the other is treated for the removal of iron impurities with the attendant regeneration of sulfuric acid.

Proposals have been made whereby iron and aluminum may be removed concurrently from leach solutions. Thus, for example, U.S. Patent 2,296,423 discloses a method whereby acid solutions containing iron (or iron and aluminum) are subjected to high temperature and pressure in an autoclave to hydrolize sulfates of ferric iron and aluminum and precipitate basic salts with a simultaneous generation of free acid. According to the patent, oxidation of iron to the ferric state is promoted by the direct injection of oxygen into the solution while the solution is at high temperature and pressure. The patent further teaches the addition of an alkali salts, e.g., sodium sulfate or sodium chloride, to promote the precipitation. Soluble iron oxides are added to partly consume the free acid generated in the autoclave operation. The precipitate formed under the conditions taught by the patent is disclosed to be a double basic salt or alkali metal and iron, analogous to the natural mineral natrojarosite, $Na_2SO_4 \cdot 3Fe_2(OH)_4 \cdot SO_4$. The patent further teaches that if aluminum is present in the solution both the iron and aluminum can be nearly completely precipitated as a complex basic iron aluminum alkali sulfate. Thus, the iron and aluminum values are chemically and physically bonded. The proportions of the reagents required by the patent are quite specific and depend upon the stoichiometry of the reactions postulated in the disclosure. Thus, for example, the patent directs the industry to adjust the proportion of alkali metal so that the solution contains approximately one mole of alkali metal sulfate for each mole of trivalent metal sulfate and two moles of the oxide of a trivalent metal (e.g., iron) for each mole of the corresponding trivalent metal sulfate in solution. When ferrous sulfate is present in the solution rather than ferric sulfate, the patent directs adjusting the solution to contain approximately two moles of alkali metal sulfate for each six moles of ferrous sulfate in the solution and approximately three moles of ferric oxide for each six moles of ferrous sulfate in the solution and thereafter oxidizing all of the dissolved iron to the ferric state.

SUMMARY OF THE INVENTION

The present inventon provides a continuous process for purifying acid sulfate leach liquors by the concurrent removal of dissolved aluminum, iron, and other multivalent cations. The practice of the invention further results in the concurrent regeneration of acid. The process also converts an appropriate proportion of the dissolved iron remaining in solution to the ferric state desired for leaching. Leach liquors may be treated in accordance with this invention either before or after the recovery of copper values therefrom.

The precipitate produced by the treatment includes the highly desirable alunite described in the said copending application Ser. No. 533,965, in admixture with other coarse precipitated salts. Aluminum and iron values are precipitated as separate mineral species, thereby facilitating the recovery of either iron or aluminum values therefrom. The precipitate exhibits a fast filtering rate, e.g., at least about 100 to 200 or more pounds per square foot per hour, much in excess of the filtering rates of the precipitates of the prior art. Ferric hydroxide-Jarosite precipitates, for example, normally exhibit filtering rates of less than 10 pounds per square foot per hour, often much lower rates.

The purification aspect of the process is accomplished by hydrolyzing the multivalent metal ions, including ferric iron and aluminum, in the leach solution for a limited period, usually between about 1 and about 5 minutes, in an autoclave or reaction zone at elevated temperatures and pressures while simultaneously contacting the solution with an oxidant for the metal ions in the presence of a salt of either an alkali metal or ammonia.

To insure the obtention of the desired precipitate, several process variables must be carefully co-ordinated. Thus, for example, the pH of the solution should be maintained below about 4.0 during the entire process. The temperature in the reaction zone should be maintained between about 300 to about 500° F., at autogenous pressure. The temperatures disclosed herein and in the claims will, of course, be adjusted to compensate for either higher or lower pressures if such pressures are chosen in practice. For best results, the pressure in the reaction zone should be above about 100 p.s.i.g., preferably between about 150 and about 250 p.s.i.g. The hydrolysis must be conducted in the presence of alkali metal and/or ammonium ions. Appropriate salts, such as sodium chloride, sodium sulfate, ammonium chloride and ammonium sulfate, which are soluble in the acid solution fed to the reactor, are added to the soltion to adjust the concentration of the alkali metal and/or ammonium ion to the equivalent of about 0.01 mole to about 0.1 mole of the salt (or salts) per liter. A controlled amount of oxidant, notably oxygen, is introduced to oxidize various solution constituents, including iron, to valence states of +3 or higher.

Retention time of the solution in the reaction zone is another important aspect of this invention. It has been found practical to purify leach solutions with very short retention times in the reaction zone, provided the other process variables are suitably adjusted. Retention times as low as about 1 minute are often effective. Retention times in excess of about 5 minutes are ordinarily undesirable because the precipitates tend to re-dissolve. Thus, the claimed process lends itself to continuous operation.

The several enumerated process variables are somewhat interdependent. Thus, for example, as the retention time of the solution in the reactor is increased, the concentration of alkali metal ions may be decreased. The amount of oxidant required to result in satisfactory removal of impurities and appropriate adjustment of ferric ion content also depends upon retention time, temperature, and pressure, as well as other considerations not directly connected with the claimed process. For example, if the treatment is conducted prior to forwarding the solution to a copper precipitation plant, it is ordinarily desirable to reduce the amount of oxidant employed, thereby to avoid forwarding excessive quantities of ferric ions to the plant. Those skilled in the art can readily determine the desired specific operating conditions to achieve, most efficiently and economically in a given instance, the benefits of this invention by referring to the teachings of this disclosure and by following the guidelines presented herein.

Any reactor which provides for continuous flow-through and short retention may be used. A highly preferred reactor type is an elongate cylindrical zone, adapted to receive solution at one end and discharge solution at the opposite end. Typical of such reactors is a "pipe reactor." The reactor may conveniently be in the form of a pipe of suitable length to provide the appropriate retention time and turbulence at the rate of flow required to handle the quantity of solution being treated. Heat may be provided in a variety of ways known in the art, preferably by steam injection. Oxygen, or other oxidant, is conveniently introduced countercurrent to the flow of the solution.

As a result of the aforedescribed hydrolysis, a considerable amount of acid is regenerated. This acid supplies all or a major portion of the acid required to be added to depleted leach liquor prior to its recycle to the leaching step. The purified, regenerated, leach solution also carries valuable sensible heat to the recycle leach stream. In addition to the other advantages of the present invention, the regenerated, purified, leach liquor contains a controlled concentration of ferric ions in solution. Thus, the prior art procedure of forwarding leach solution to bacterial vats or ponds, with its attendent high evaporation loss of water, for adjustment of ferric ion content is no longer required. Accordingly, the present invention provides a single, continuous, one-step operation whereby a leach solution may be treated, either before or after the metal recovery step, to remove impurities, regenerate acid, and adjust ferric ion content. In this fashion, there is continuously provided a leach liquor suitable for recycle to leaching dumps, heaps, or vats.

The preferred oxidant for use in the present invention is oxygen. The oxygen may be used in more or less pure form or it may be mixed with other gases, for example, as in air. The air or oxygen may be ozonized although such ozonization is not requisite to the practice of the present invention. Other oxidants which are suitable for use in certain instances include the peroxides of hydrogen and the alkali metals, e.g. sodium peroxides; and anodic electricity.

The present invention is particularly applicable to the purification of solutions containing high levels of both aluminum and iron. It has been found, however, that a readily filterable precipitate including aluminum, iron and other trivalent metal values is obtained even though the aluminum is present in relatively small amounts compared to the other impurities such as iron. Typical leach solutions treated in accordance with this invention contain between about 0.10 and about 50 grams per liter copper and between about 10 and about 200 grams per liter of multivalent impurities, including about 5 to about 50 grams per liter aluminum, reported as $Al_2O_3$; and up to about 25 grams per liter iron; the remainder being other multivalent cations of elements such as manganese and arsenic, reported as $As_2O_3$.

DESCRIPTION OF THE DRAWING

The single figure of the drawing is a flow sheet illustrating what is presently contemplated as the best mode of practicing the claimed invention.

DESCRIPTION OF THE ILLUSTRATED EMBODIMENT

Referring to the drawing, a dilute, acid sulfate leach solution derived from a copper leaching operation, is treated in conventional fashion to recover copper metal. Depleted leach solutions from metal recovery plants vary in composition. Table 1 reports the typical ranges of concentrations of various components in such depleted leach solutions, as well as specific examples of typical solution compositions.

TABLE 1.—DEPLETED SOLUTION COMPOSITIONS

| Component | Concentration, grams/liter | | | |
|---|---|---|---|---|
| | Typical range | Examples | | |
| | | I | II | III |
| Copper [1] | 0.1-15 | 0.10 | 13.7 | 18.8 |
| Mg (MgO) | 1-20 | 10.50 | 15.0 | 16.1 |
| Iron: | | | | |
| Total | 1-25 | 6.15 | 18.3 | 13.6 |
| Ferric | 0.01-20 | 0.15 | 11.9 | 0.4 |
| Aluminum ($Al_2O_3$) | 2-50 | 9.49 | 33.4 | 22.9 |
| Manganese | 0.01-5 | 0.32 | 0.5 | 4.1 |
| Other multivalent cations | 0.01-10 | 0.25 | 0.41 | 3.6 |
| pH | 4-0.1 | 3.40 | 0.85 | 3.15 |

[1] Pregnant leach solution may be treated prior to the recovery of copper values therefrom. Such solutions may contain up to 50 grams per liter or more copper. The concentration of the other solution components reported in this table are typical also of such pregnant solutions.

A portion of the depleted solution, normally between about 20 to about 100 percent of the total flow, is treated to effect its purification and regeneration. The solution is desirably passed through heat exchanges to bring its temperature up to the range of about 200 to about 300° F. Appropriate salts are added to the solution, as required, to establish the concentration of alkali metal and/or ammonium salt in the range of about 0.01 mole to about 0.1 mole per liter. Higher concentrations of salt are avoided because they tend to promote the formation of natrojarosites and similar slimy precipitates. The solution is then introduced continuously to an elongate reaction zone, preferably a pipe reactor. The solution flows continuously through the pipe reactor wherein it is contacted with an oxidizing gas and heated to the desired range of about 300 to about 500° F., preferably by steam injection. The oxidizing gas is introduced to the reactor through suitable compressors. Sufficient oxidant is introduced to insure that the purified solution removed from the reactor contains the desired concentration of ferric ions. In the fashion, the need for further process steps to provide ferric sulfate for leaching purposes is obviated. The oxidant also tends to maintain other cation impurities in multivalent states, i.e., valence states of at least 3, thereby encouraging the reaction of these impurities to form insoluble salts.

A slurry of precipitate in purified and regenerated solution is withdrawn from the reactor through the heat exchanger and filtered.

Typical ranges of analysis of the precipitate are reported in Table 2. The table also reports specific analyses corresponding to the typical solution compositions reported as Examples I, II, III of Table 1.

TABLE 2.—PRECIPITATES

| Component | Percent by weight | | | |
|---|---|---|---|---|
| | Typical range | Examples | | |
| | | I | II | III |
| Copper | 0.01-3 | 0.01 | 0.7 | 1.1 |
| Mg(MgO) | 0.1-3.5 | 0.5 | 0.2 | 0.2 |
| Iron (total) | 0.5-35 | 37.5 | 17.1 | 7.6 |
| Aluminum ($Al_2O_3$) | 0.25-42 | 35.7 | 15.1 | 26.4 |
| Manganese | 0.1-35 | 0.5 | 1.1 | 4.6 |
| Arsenic ($As_2O_3$) | 0.01-5 | 0.1 | 0.4 | 2.4 |
| Other multivalent cations | 0.1-5 | 0.1 | 0.4 | 5.1 |

Table 3 reports typical ranges of concentration of components of the regenerated, purified solutions corresponding to the precipitates reported in Table 2.

TABLE 3.—REGENERATED, PURIFIED SOLUTION

| Component | Concentration, grams/liter | | | |
|---|---|---|---|---|
| | Typical range | Examples | | |
| | | I | II | III |
| Copper | 0.01-25 | 0.09 | 13.8 | 18.9 |
| Mg(MgO) | 1-20 | 10.3 | 14.9 | 16.2 |
| Iron: | | | | |
| Total | 0.5-15 | 0.90 | 8.0 | 8.8 |
| Ferric | 0.4-10 | 0.80 | 7.7 | 8.4 |
| Aluminum ($Al_2O_3$) | 1-30 | 0.51 | 26.0 | 8.9 |
| Manganese | 0.01-3 | 0.05 | 0.1 | 2.7 |
| Other multivalent cations | 0.01-5 | 0.15 | 0.2 | 0.7 |
| pH | 0.1-1.5 | 0.95 | 0.45 | 0.80 |

Regenerated solution typically has a pH between 0.1 to 1.5 and leaves the filtration step of the process at a temperature between about 100 to about 200° F.

The precipitates may be dried, typically to less than about 8 percent moisture, and stored. Alternatively, the precipitates may be sent to by-products recovery plants for metal and/or salts production, dependent upon commercial demand. Reusable sponge iron or powdered iron may be produced from the precipitate and recycled to the copper stripping stages, if desired.

Regenerated, purified, solution, typically amounting from about 20 to about 100 percent of the total recycled flow, is sent to a mixing and control plant where it is metered into the main recycle flow, together with any additional acid required. The resultant controlled recycle leach solution is highly advantageous for copper leaching because of its low iron and alumina content plus the sensible heat and acid content carried with the recycled, treated solution into the mixing plant. In addition, a controlled portion of the dissolved iron in the recycled solution is, by virtue of the claimed treatment, in the ferric form necessary for efficient mineral solvent action.

The following examples described the specific operating conditions whereby the depleted solution designated, I, II, III, respectively, in Table 1 are treated to produce the correspondingly designated precipitates reported in Table 2 and the correspondingly designated regenerated, purified solutions reported in Table 3:

Example I.—Depleted leach solution is passed through a heat exchanger to raise the temperature of the solution to about 290° F. The solution is then continuously mixed with sufficient saturated sodium sulfate solution to establish a concentration of sodium sulfate in the solution of about 5 grams per liter. The mixed solution is then forwarded to a pipe reactor operating at about 360° F. The temperature of the reactor is maintained by steam injection. The autogenous pressure in the reactor is about 160 p.s.i.g. The flow rate through the reactor is adjusted to provide a retention time for the solution in the reactor of about 1 minute. Compressed oxygen is introduced to the reactor at several points along its length. The flow of oxygen into the reactor is adjusted until the analysis of the effluent from the reactor indicates a ferric ion concentration of about 0.8 gram per liter. Effluent slurry is passed through the heat exchanger to reduce its temperature to about 100° F. Precipitate is filtered from the slurry.

Example II.—Following the procedure of Example I, depleted leach solution is passed through a heat exchanger to raise the temperature of the solution to about 300° F. The solution is then continuously mixed with sufficient saturated sodium sulfate solution to establish a concentration of sodium sulfate in the feed solution of about 12 grams per liter. The mixed solution is then forwarded to a pipe reactor operating at about 385° F. The autogenous pressure in the reactor is about 210 p.s.i.g. The flow rate through the reactor is adjusted to provide a retention time for the solution in the reactor of about 3 minutes. The flow rate of the oxygen is adjusted to establish the ferric ion concentration in the effluent from the reactor at about 7.7 grams per liter.

Example III.—Following the procedure of Example I, depleted leach solution is passed through the heat exchanger to raise the temperature of the solution to about 300° F. The sodium sulfate concentration of the solution is adjusted to about 10 grams per liter. The mixed solution is then forwarded to the pipe reactor operating at about 400° F. The autogeneous pressure in the reactor is about 250 p.s.i.g. The flow rate through the reactor is adjusted to provide a retention time for the solution in the reactor of about 22 minutes. The flow rate of oxygen is adjusted to establish the ferric ion concentration in the effluent from the reactor at about 8.4 grams per liter.

Reference herein to certain details of the illustrated embodiments is not intended to impose any limitation on the scope of the invention except insofar as these details are specifically recited in the appended claims. Many modi-

We claim:
1. In the treatment of acid sulfate leach solutions contaminated with appreciable amounts of dissolved aluminum, dissolved iron, and other multivalent metal ion impurities by hydrolyzing said impurities at elevated temperature and pressure to produce acid leach solutions with acceptably low levels of said impurities and to regenerate acid required for additional leaching, and to oxidize by oxidizing iron dissolved in said leach solution to the ferric state, the improvement which comprises:
   adjusting the concentration of salts selected from the group consisting of alkali metal salts and ammonium salts in said solution to between about 0.01 and about 0.1 mole per liter; and
   continuously passing the contaminated solution at a pH below about 4.0 through an elongate reaction zone at temperature and pressure conditions corresponding to the range of about 300 to about 500° F. at autogeneous pressure; while
   concurrently contacting said solution in said reaction zone with an oxidant for said metal ions, thereby causing the formation of a coarse precipitate, including alunite, and the concurrent oxidation of dissolved iron to the ferric state, the retention time of the solution in the reactor being maintained sufficiently low to avoid redissolution of the precipitate; separating the precipitate from the leach solution; and recovering a regenerated, purified, acid leach solution.

2. An improvement according to claim 1, wherein the leach solution treated contains at least about 2 grams per liter dissolved aluminum and at least about 1 gram per liter dissolved iron.

3. An improvement according to claim 1 wherein the residence time of the solution in the reactor is held to between about 1 and about 5 minutes.

4. A continuous process for regenerating and purifying acid sulfate leach solution contaminated with undesirably high levels of dissolved aluminum and iron values which comprises:
   continuously introducing the contaminated leach solution to a reaction zone wherein its pH is maintained below about 4 and continuously withdrawing regenerated, purified leach solution from said reaction zone;
   providing in said leach solution a concentration of salts selected from the group consisting of alkali metal and ammonium salts of at least about 0.01 mole per liter but below the concentration which promotes the formation of a complex basic iron aluminum alkali sulfate during hydrolysis;
   establishing and maintaining the temperature, pressure, and residence time of the leach solution in said zone to effect the precipitation of substantial amounts of both iron and aluminum values from said contaminated leach solution, thereby to establish sufficiently low concentrations of iron values and aluminum values in said solution to render it acceptable for leaching purposes while concurrently increasing the acid content in the regenerated, purified leach solution;
   concurrently contacting the solution with sufficient oxidant for ferrous ions to establish a desired concentration of ferric ions in the regenerated, purified leach solution;
   and continuously recovering the regenerated purified leach solution.

5. A process according to claim 4 wherein the solution is heated in said reaction zone to a temperature corresponding to between about 300 and 500° F. at autogenous pressure.

6. A process according to claim 5, wherein the pressure within the reaction zone is maintained between about 150 and about 250 p.s.i.g.

7. A process according to claim 6 wherein the retention time of the solution in the reaction zone is held between about 1 and about 5 minutes.

8. A process according to claim 7 wherein the concentration of salts from the group consisting of alkali metal and ammonium salts in the solution introduced to the reaction zone is held between about 0.1 and about 0.1 moles per liter.

9. A process according to claim 4, wherein the oxidant is oxygen.

10. A process according to claim 4, wherein the solution being treated contains at least about 1 gram of dissolved iron per liter.

References Cited

UNITED STATES PATENTS 2,296,423  9/1942  Clark _____ 23—117

OSCAR R. VERTIZ, *Primary Examiner.*

ARTHUR GREIF, *Assistant Examiner.*

U.S. Cl. X.R.

75—115, 117